(12) United States Patent
Budic et al.

(10) Patent No.: US 8,694,018 B2
(45) Date of Patent: Apr. 8, 2014

(54) LOAD BALANCING IN A CELLULAR TELECOMMUNICATION NETWORK

(75) Inventors: Miroslav Budic, Murphy, TX (US); Abdennaceaur Lachtar, Plano, TX (US); Narendra Tilwani, Addison, TX (US); Pulin Chhatbar, Plano, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 280 days.

(21) Appl. No.: 13/162,305

(22) Filed: Jun. 16, 2011

(65) Prior Publication Data

US 2012/0231824 A1 Sep. 13, 2012

Related U.S. Application Data

(60) Provisional application No. 61/451,235, filed on Mar. 10, 2011, provisional application No. 61/451,245, filed on Mar. 10, 2011, provisional application No. 61/451,545, filed on Mar. 10, 2011.

(51) Int. Cl.
*H04W 72/00* (2009.01)

(52) U.S. Cl.
USPC ........... 455/453; 455/450; 455/436; 455/439; 370/252

(58) Field of Classification Search
CPC ..... H04W 16/06; H04W 16/08; H04W 28/02; H04W 28/08

USPC .................................. 455/453, 450, 436, 439
See application file for complete search history.

(56) References Cited

U.S. PATENT DOCUMENTS

2010/0136984 A1* 6/2010 Brisebois ...................... 455/446
2011/0294503 A1* 12/2011 Tran et al. ..................... 455/434

* cited by examiner

*Primary Examiner* — Wayne Cai
*Assistant Examiner* — Chuck Huynh

(57) ABSTRACT

A method and apparatus for controlling a Network Load Balancing (NLB) algorithm that balances a traffic load between multiple downlink (DL) sectors in a cellular telecommunication network. A Connection Integrity Preservation (CIP) algorithm, which runs on top of the NLB algorithm in the Radio Network Controller/Base Station Controller (RNC/BSC), minimizes the risk of degrading network performance due to NLB offload decisions. The CIP algorithm may override an NLB offload decision, for example, if there have been too many offload failures, there are no target DL sectors available to acquire an offloaded Access Terminal (AT), or the offloaded AT is not acquired within a threshold time period. The CIP algorithm ensures required metrics are collected, and minimizes the impact on RNC/BSC processing due to Routing Update messages needed to make offload decisions. The invention enables the NLB algorithm to realize its potential without negative side-effects.

22 Claims, 4 Drawing Sheets

FIG. 1B

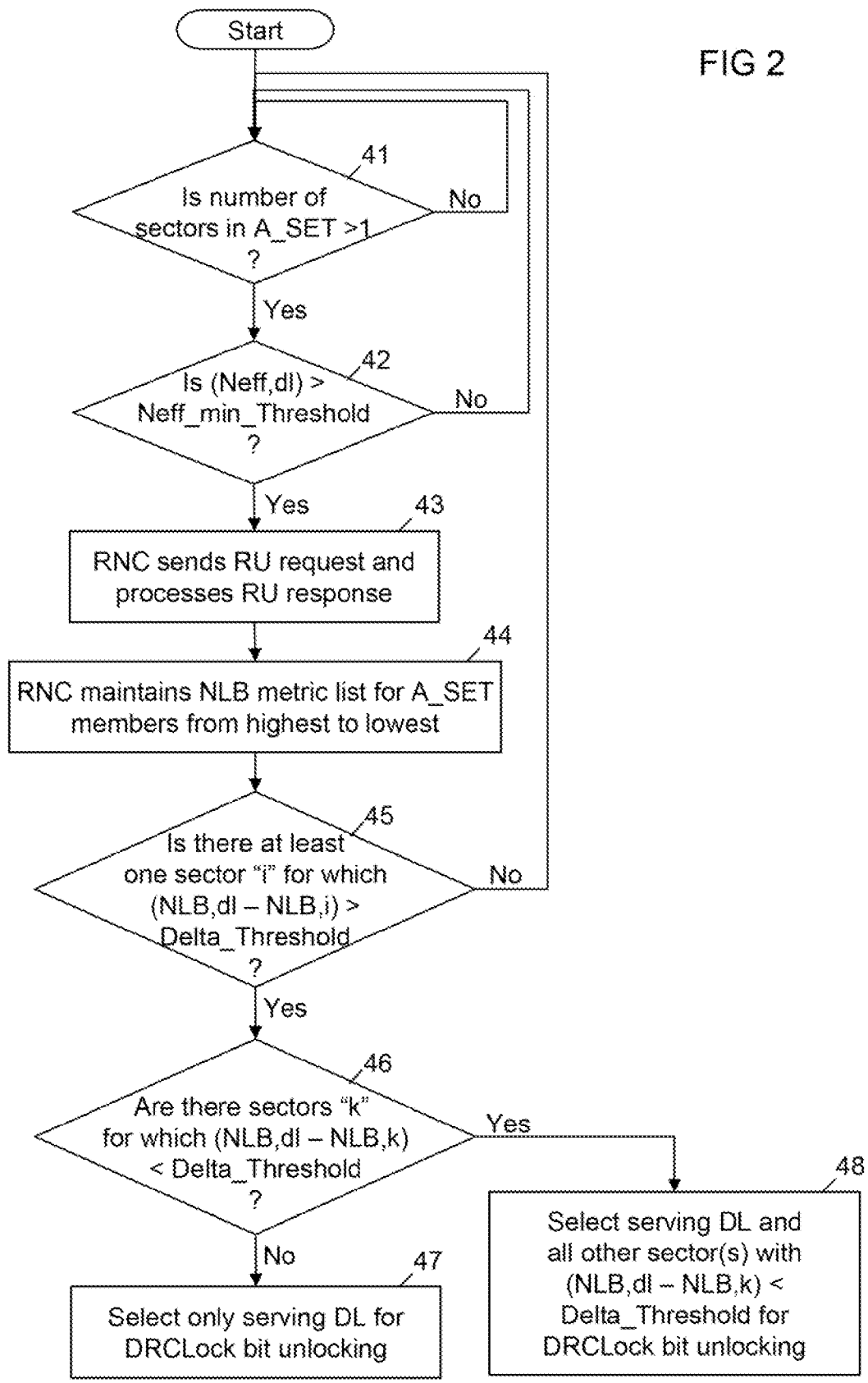

LOAD BALANCING IN A CELLULAR TELECOMMUNICATION NETWORK

CROSS-REFERENCE TO RELATED APPLICATIONS

This application claims the benefit of U.S. Provisional Patent Application No. 61/451,235 filed Mar. 10, 2011; U.S. Provisional Patent Application No. 61/451,245 filed Mar. 10, 2011; and U.S. Provisional Patent Application No. 61/451,545 filed Mar. 10, 2011, the disclosures of which are fully incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to cellular telecommunication systems. More particularly, and not by way of limitation, the present invention is directed to an apparatus and method for balancing a traffic load between multiple radio cells.

In existing 1x Evolved-Data Optimized (1x-EV-DO) advanced networks, a Network Load Balancing (NLB) algorithm provides methods of off-loading traffic from more loaded radio cells to less loaded radio cells by manipulating allowed forward/downlink Base Transceiver Station (BTS) sectors from an Active Set (A_SET), for every active over-the-air connection. The NLB algorithm utilizes the measured load on BTS sectors in the A_SET and forces an Access Terminal (AT) to get service from a less loaded sector. This is done by having the Radio Network Controller (RNC) or Base Station Controller (BSC) unlock a Data Rate Control Lock (DRCLock) bit in a serving downlink (DRCLock=0), which forces the AT to select a different serving downlink sector among the pilots from the A_SET.

Although helping to balance the traffic load and improve capacity and individual user throughput, the NLB algorithm may degrade existing radio connection Key Performance Indicators (KPIs) for several reasons. First, since the algorithm moves ATs from preferred downlink sectors to possibly less optimum sectors, this may lead to degraded connection loss statistics. The connection drop rate is an important KPI that network operators use to measure overall health of the over-the-air connectivity. Degradation of this KPI could invalidate capacity gains and prevent successful NLB implementation.

Second, the NLB algorithm requires periodic Route Update reports from the ATs so that the algorithm can consider current RF signal quality when making its balancing decisions. There is no option to set periodic reporting in 1x-EV-DO, so Route Update Messages have to be solicited to get the reports. This puts additional strain on the call processing entity at the RNC, and needs to be minimized without compromising the ability of the NLB algorithm to gauge the signal strengths of forward/downlink pilots in the A_SET.

Third, the NLB algorithm must have a correct set of NLB metrics to determine whether moving a given AT from one downlink sector to another will do more harm than good due to adverse effects on other ATs. Without mechanisms for obtaining these metrics, the NLB algorithm may degrade Signal-to-Noise Ratio (SNR) and Quality of Service (QoS) for larger numbers of ATs.

SUMMARY

The present invention provides solutions to the above-mentioned problems. In one embodiment, the invention provides an RNC algorithm referred to herein as the Connection Integrity Preservation (CIP) algorithm, which runs on top of the NLB algorithm and provides steps, measures, and checks that minimize the risk of degrading over-the-air connectivity KPIs due to forced offload decisions, and enable the NLB algorithm to realize its potential without negative side-effects. The CIP algorithm runs for each active connection for which NLB offloading decisions have been made, and ensures that all forward/downlink servers that have been force-barred by the NLB can be made available again, when the CIP algorithm detects that the connection may drop. In addition, basic protections are put in place to prevent the NLB algorithm from making repetitive offload decisions if there is a history of previously failed offload attempts during the same connection.

In another embodiment, the present invention also ensures the NLB algorithm receives the Route Update Messages it needs to gauge the signal strengths of forward/downlink pilots in an AT's A_SET, while minimizing the signaling and call processing load on the RNC. This embodiment ensures that a minimum threshold level of contention is present in the current forward/downlink sector before the RNC sends periodic Route Update Request messages and processes the responses to those messages. This minimizes the call processing impact by ensuring that Route Update Requests and Route Update Messages are sent only when required. Furthermore, this embodiment provides procedures for unlocking the DRCLock bit not only on the serving forward/downlink sector, but also on other loaded sectors so that the AT is forced to the least loaded sector.

In a further embodiment, the invention also prevents excessive sector switching where the capacity benefit (in terms of metric difference between the current serving sector and a target sector) is too small. Likewise, the invention may prevent a forced offload when the adverse impact on other ATs is determined to be too great.

In a particular embodiment, the present invention is directed to a method of controlling an NLB algorithm that balances a traffic load between multiple downlink (DL) sectors in a cellular telecommunication network, wherein the method is performed by a processor associated with a Radio Network Controller/Base Station Controller (RNC/BSC). The method includes the steps of detecting that the NLB algorithm has decided to offload a given Access Terminal (AT) from a current serving DL sector to one of a plurality of target DL sectors in the given AT's active set due to a high traffic load in the current serving DL sector; determining a count of previous attempts to offload the given AT from the current serving DL sector that failed because the given AT was not acquired by any of the target DL sectors; and when the count of failed previous attempts to offload the given AT from the current serving DL sector exceeds a threshold amount, overriding the NLB algorithm decision to offload the given AT from the current serving DL sector.

In further embodiments, the method may include overriding the NLB algorithm decision to offload the given AT from the current serving DL sector when an earlier attempt to offload the given AT failed and the time period since the failure has been too short. Additionally, the invention may override the NLB algorithm decision to offload the given AT from the current serving DL sector when there are no target DL sectors in the given AT's active set that are currently allowed to acquire the given AT.

In another embodiment, the invention is directed to an apparatus in an RNC/BSC for controlling an NLB algorithm that balances a traffic load between multiple DL sectors in a cellular telecommunication network. The apparatus includes a processor and a non-transitory memory for storing a Connection Integrity Preservation (CIP) algorithm. When the processor executes the CIP algorithm, the apparatus is caused to perform the steps of detecting that the NLB algorithm has decided to offload a given AT from a current serving DL sector to one of a plurality of target DL sectors in the given AT's active set due to a high traffic load in the current serving DL sector; determining a count of previous attempts to offload the given AT from the current serving DL sector that failed because the given AT was not acquired by any of the target DL sectors; and when the count of failed previous attempts to offload the given AT from the current serving DL sector exceeds a threshold amount, overriding the NLB algorithm decision to offload the given AT from the current serving DL sector.

In another embodiment, the invention is directed to an apparatus in an RNC/BSC for controlling an NLB algorithm that balances a traffic load between multiple DL sectors in a cellular telecommunication network. The apparatus includes a processor and a non-transitory memory for storing a CIP algorithm. When the processor executes the CIP algorithm, the apparatus is caused to perform the steps of determining whether a time period since an earlier failed attempt to offload the given AT has been too short; and overriding the NLB algorithm decision to offload the given AT from the current serving DL sector when the time period since the earlier failed attempt has been too short.

In another embodiment, the invention is directed to an apparatus in an RNC/BSC for controlling an NLB algorithm that balances a traffic load between multiple DL sectors in a cellular telecommunication network. The apparatus includes a processor and a non-transitory memory for storing a CIP algorithm. When the processor executes the CIP algorithm, the apparatus is caused to perform the steps of determining whether there are any target DL sectors in the given AT's active set that are currently allowed to acquire the given AT; and overriding the NLB algorithm decision to offload the given AT from the current serving DL sector when there are no target DL sectors in the given AT's active set that are currently allowed to acquire the given AT.

BRIEF DESCRIPTION OF THE DRAWINGS

In the following section, the invention will be described with reference to exemplary embodiments illustrated in the figures, in which:

FIG. 2 is a flow chart illustrating the steps of an exemplary embodiment of a method of providing the NLB algorithm with the Route Update Messages it needs to gauge the signal strengths of forward/downlink pilots in an AT's active set.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention can be implemented in hardware or in a combination of hardware processor(s) and computer program instructions stored on a non-transitory storage medium.

Figure 1A:
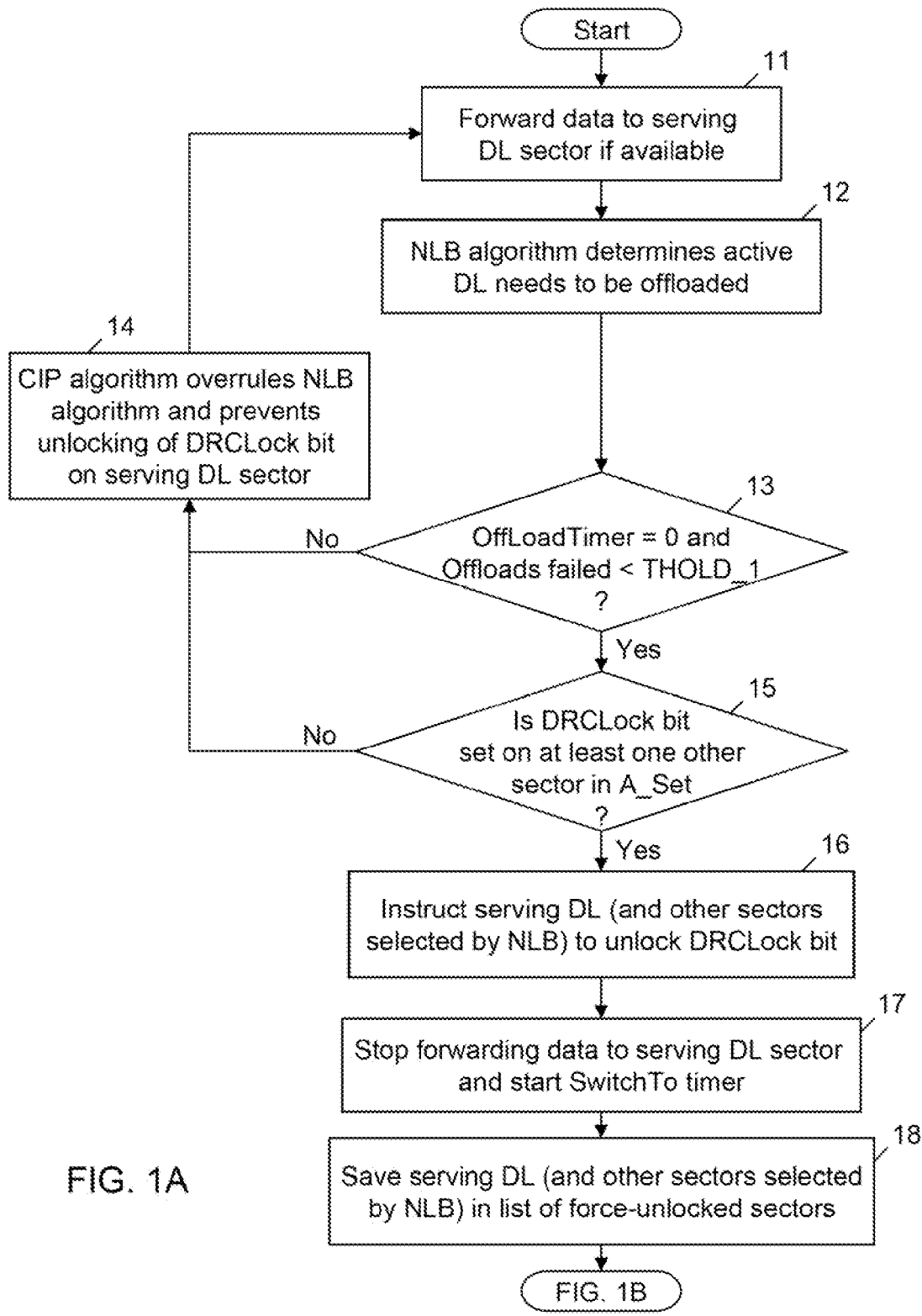
FIGS. 1A-1B are portions of a flow chart illustrating the steps of an exemplary embodiment of the Connection Integrity Preservation (CIP) algorithm.

FIG. 1A is a flow chart illustrating the steps of an exemplary embodiment of a first portion of the Connection Integrity Preservation (CIP) algorithm. At step 11, data is forwarded to the serving DL sector, if available. At step 12, the NLB algorithm determines that the active DL sector is overloaded (and potentially other sectors as well) and a given AT needs to be offloaded. At this point, the CIP algorithm makes a check to determine whether the offload should be allowed. At step 13, the CIP algorithm determines whether there were any previous failed attempts to offload the given AT from the current serving DL sector. This may be done by determining whether there is a running OffLoadTimer and whether the count of previously failed offloads of the given AT is greater than a configurable threshold THOLD_1. An "offload failure" is intended to refer to an event where a forced DRC unlock was performed to the current serving DL sector, but no other radio node indicated successfully acquiring the AT that was offloaded within a configurable period of time controlled by a SWITCH_TO timer.

When the OffLoadTimer is >0 or the count of previously failed offloads of the given AT is greater than THOLD_1, the method moves to step 14 where the CIP algorithm overrules the NLB decision and prevents unlocking of the DRCLock bit on the current serving DL sector. Data continues to be forwarded to the serving DL sector. However, when the OffLoadTimer=0 and the count of previously failed offloads of the given AT is less than THOLD_1, the method moves to step 15 where the CIP algorithm causes the RNC to determine whether the DRCLock bit is set on any other sector/cell in the given AT's current A_SET, other than the ones the NLB algorithm has indicated should be offloaded. In other words, the RNC determines whether there are any other DL sectors in the AT's A_SET that are allowed to acquire the AT. When there are none, the method returns to step 14 where the CIP algorithm overrules the NLB decision and prevents unlocking of the DRCLock bit on the current serving DL sector. The purpose of this check is to prevent forced offloads when there are no other radio nodes in the current A_SET capable of acquiring the offloaded AT. When there is at least one other sector in the current A_SET with the DRCLock bit set, the method moves to step 16 where the RNC honors the NLB algorithm decision and instructs the serving DL sector (and any other sectors the NLB selected) to force-unlock the DRCLock bit. At step 17, the flow of data to the serving DL sector is stopped and a SwitchTo timer is started (i.e., acquisition of the new serving DL sector is expected to occur within this time-out period). At step 18, the RNC saves all force-unlocked sectors in a list for later referral, if needed.

Figure 1B:
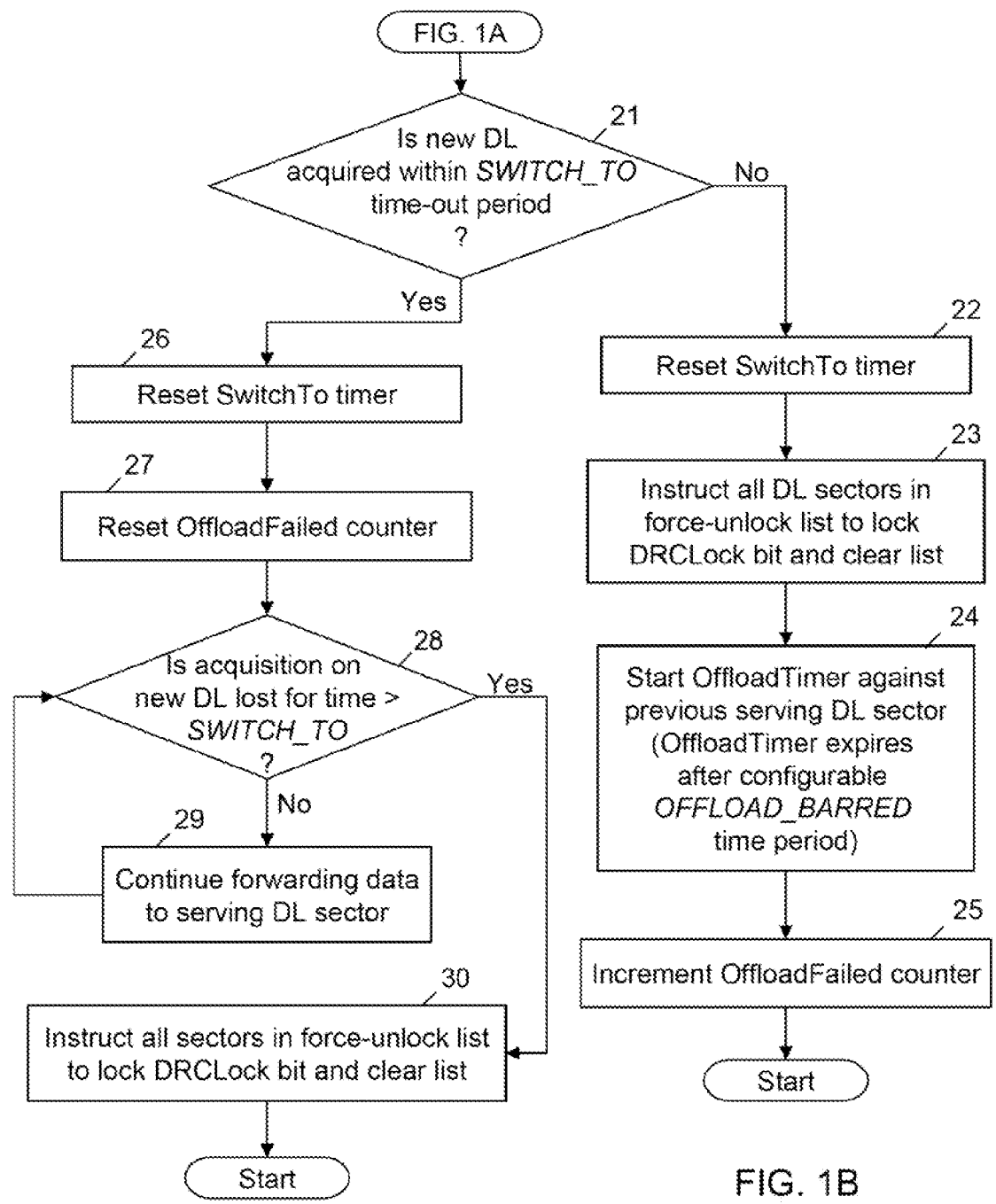

FIG. 1B is a flow chart illustrating the steps of an exemplary embodiment of a second portion of the CIP algorithm. After the force-unlock action shown in FIG. 1A, the RNC expects to receive an indication from one of the serving radio nodes, other than the one that was force-unlocked, that the given AT has been acquired within a predefined time period.

Thus at step 21, the RNC determines whether a new radio node acquires the offloaded AT within the SWITCH-TO time period defined by the SwitchTo timer. If not, the CIP algorithm assumes the AT was not successful in switching to the new DL and hence connection integrity is in question. At step 22, the CIP algorithm resets the SwitchTo timer. At step 23, the CIP algorithm instructs all sectors in the force unlocked list to lock the DRCLock bit again, and the CIP algorithm clears the list. At step 24, the CIP algorithm starts an Offload-Timer against the previously serving DL sector. The Offload-Timer temporarily prevents switching for a configurable time period defined by the variable OFFLOAD_BARRED (for example for 500 ms). When the OFFLOAD_BARRED time period expires, OffloadTimer resets to 0 and NLB switching is allowed again, unless the failure counter is greater then or equal to THOLD_1. At step 25, the CIP algorithm increments an OffloadFailed counter. The method then returns to the start of FIG. 1A.

The OffloadTimer timer and the OffloadFailed counter are utilized to prevent successive NLB-induced offloads that have recently failed to complete in the same active connection.

When the AT's DRCCover change is successfully decoded by the new radio node and the RNC gets that information within the SWITCH-TO time period, the method moves from step 21 to step 26 where the CIP algorithm stop/resets the CIP's SwitchTo timer. At step 27, the CIP algorithm resets the OffloadFailed counter. The method then moves to step 28 where the CIP algorithm causes the RNC to monitor whether there is ever an event where acquisition on the serving DL is lost for a time greater than SWITCH_TO. If not, the RNC continues forwarding data to the current serving DL sector at step 29. However, if the acquisition on the serving DL is lost for a time greater than SWITCH_TO, this indicates an event where connection may be potentially lost. Thus the method moves to step 30 where the CIP algorithm determines whether there are any entries in the force-unlock list and if so, instructs all sectors in the force-unlock list to lock the DRCLock bit and clear the list. The method then returns to the start of FIG. 1A.

It should also be noted that the OffloadTimer and Offload-Failed counter are initialized to zero (0) at every DL change; the CIP configurables, OFFLOAD_BARRED time, and SWITCH_TO time are set large enough to circumvent a 1x Tune-away; the CIP algorithm runs separately for each active connection; the CIP flow charts illustrated in FIGS. 1A-1B depict management of a given active connection in the context of NLB algorithm decisions; and the radio node gets cleared from the force-unlocked list if it drops out of the A_SET.

Thus, the above embodiment implements protective measures to prevent a connection drop in case an NLB-induced offload fails. Artificial unlocking of the best active set server is made revocable in case other radio nodes lose acquisition on the AT at any point after artificial unlock occurs, assuming that the force-unlocked radio node is still in the A_SET. Hysteresis is built into the CIP algorithm to protect against successive failed offload attempts.

In another embodiment, the present invention also ensures the NLB algorithm receives the Route Update Messages it needs to gauge the signal strengths of forward/downlink pilots in the A_SET, while minimizing the signaling and call processing load on the RNC. This embodiment ensures that a minimum threshold level of contention is present in the current forward/downlink sector before the RNC sends periodic Route Update Request messages and processes the responses to those messages. This minimizes the call processing impact by ensuring that Route Update Requests and Route Update Messages are sent only when required. Furthermore, this embodiment provides procedures for unlocking the DRCLock bit not only on the serving forward/downlink sector, but also on other loaded sectors so that the AT is forced to the least loaded sector.

In the discussion that follows, "Neff" is the long-term measure of the number of users with non-empty queues. Each BTS sends Neff to the RNC, and the RNC queries the AT for a Route Update message only when user contention/Neff at the current serving DL sector exceeds a configured minimum threshold (Neff_min_Threshold). The RNC then starts to periodically send a Route Update Request to the AT (with a period of RuR_periodicity). The AT responds by sending a Route Update message with the Signal-to-Interference (Ec/Io) ratio of pilots in the A_SET.

The RNC then uses the metrics Neff, DRCLock, and Ec/Io from the A_SET for its load balancing decision. The RNC compares the metrics among A_SET members and determines whether a legacy AT is a candidate for NLB. If so, the RNC offloads the AT from its capacity constrained sector by setting the DRCLock bit to 0 (out-of-lock) forbidding the AT to use that sector.

FIG. 2 is a flow chart illustrating the steps of an exemplary embodiment of a method of providing the NLB algorithm with the Route Update Messages it needs to gauge the signal strengths of forward/downlink pilots in the A_SET. At step 41, the RNC determines whether the number of sectors in the A_SET is greater than one. If not, the RNC continues to monitor the A_SET until there are multiple sectors in the A_SET. The method then moves to step 42 and determines whether the Neff value of the current serving DL sector (Neff, dl) is greater than Neff_min_Threshold. If not, the method returns to step 41. If yes, the method moves to step 43 where the RNC sends a Route Update Request message to the AT and then processes the Route Update message the AT sends in response to determine an NLB metric for each candidate DL sector in the A_SET. The metric may be, for example, (Pilot_SINR (dB)−Neff (dB)), in which case the higher the metric value, the more suitable an offload candidate becomes. At step 44, the RNC maintains an NLB metric list for the A_SET members, ranked from highest to lowest.

At step 45, it is determined whether there is at least one sector "i" for which (NLB, dl−NLB, i) is greater than Delta_Threshold. If not, the method returns to step 41. If yes, the method moves to step 46 where it is determined whether there are sectors "k" for which (NLB,dl−NLB, k) is less than Delta_Threshold. If not, the method moves to step 47 where the RNC selects only the serving DL sector for DRCLock bit unlocking. If yes, the method moves to step 48 where the RNC selects for DRCLock bit unlocking, the serving DL sector and all other sector(s) with (NLB,dl−NLB, k) less than Delta_Threshold.

In another embodiment, instead of using minimum contention/Neff as the trigger to start sending periodic Route Update Request messages, the trigger may be a minimum effective physical layer, Tput, defined as DRC divided by Neff (hereafter, DRC_eff_min). Based on reports of contention/Neff from the radio nodes and the periodically reported Ec/Io for the pilots in the A_SET, applying the NLB metric will decide whether or not a forced sector switch from a serving sector to a target sector is needed. However if the difference between the metric measurements from the serving and target sectors is less than a configured Delta_Threshold, the forced sector switch is not performed. Additionally, the forced sector switch is not performed when the contention/Neff level of the target sector is higher than a configured maximum threshold (Neff_max_Threshold).

In cases where more than two sectors are part of the A_SET, there may be a need to unlock the DRCLock bit on additional sectors besides the current serving DL sector. For example, there may be three pilots P1, P2, and P3 in the A_SET, with P1 having the highest reported Ec/Io, P2 having the second highest reported Ec/Io, and P3 having the lowest reported Ec/Io. P3, however, has the best NLB metric and P2 has the worst NLB metric. The current serving sector maps to P1. In this case, there should be a switch from P1 to P3 as the target serving sector, but in order to do that, the DRCLock bit on both P1 and P2 must be unlocked to prevent the AT from accessing P2.

In this manner, the present invention minimizes the call processing impact due to sending Route Update Request messages and receiving Route Update messages in response by sending Route Update Request messages only when the RNC determines the need for it. The invention provides potential additional capacity gain in the multi-sector SHO scenario by preventively unlocking the DRCLock bit not only on the serving DL sector, but also on other loaded sectors, targeting the least loaded sector. Additionally, the invention prevents excessive sector switching when the capacity benefit (in terms of metric difference between the current serving sector and the target sector) is too small.

As noted above, the NLB algorithm must have a correct set of NLB metrics to determine whether moving a given AT from one downlink sector to another will do more harm than good due to adverse effects on other ATs. Without mechanisms for obtaining these metrics, the NLB algorithm may degrade the SNR and QoS for larger numbers of ATs. Using a correct set of metrics is essential to ensure that the load balancing gains are realized.

1x Evolved-Data Optimized (1x-EV-DO) advanced networks support both best efforsts (BE) and delay sensitive (DS) flows. DS flows are given higher priority than BE flows during packet scheduling. Hence a DS flow active on a sector will impact the perceived throughput for a BE flow. If an AT is offloaded to a sector with a large number of DS flows, the AT may experience worse performance. Currently there is no consideration of impact due to DS flows. Also offloading a given AT may improve the user experience for that AT but degrade service for all other ATs. Currently, the NLB algorithm does not consider the impact on the performance of other users resulting from the network balancing. In an further embodiment of the present invention, these problems are also addressed.

In this embodiment, during the determination of AT offloading, the NLB algorithm computes an NLB metric to determine the sector to which traffic should be offloaded. This embodiment ensures that additional metrics are calculated, which consider the impact due to DS flows. Further the embodiment takes into account the performance of other users and overall sector throughput performance, and ensures it is not severely degraded.

The NLB algorithm is executed per AT. Based on the sector load (Neff), an AT's pilot strength (Ec/Io), and the A_SET, a target sector is selected to offload the AT. An NLB Metric ($NLB_M$) has the following relation to each of these metrics:

The lower the sector load, the higher the likelihood of selecting the target sector since it would provide a better user throughput. Neff is normalized by the total usable slots for unicast traffic.

$$NLB_M \propto 1/Neff$$

The higher the pilot strength of the target AT, the higher the likelihood of having a successful offload.

$$NLB_M \propto (Ec/Io)_{AT}$$

In this embodiment, the NLB algorithm calculates an enhanced NLB Metric ($NLB_{M\_Enh}$). The NLB algorithm first considers a DS flow factor. Since DS flows are given Entry higher priority in the network, having more DS flows implies fewer slots available to share between non-delay sensitive (e.g., BE) flows. This in turn will result in lower throughput. Hence a sector having high number of DS flows may not be a good candidate to which to offload ATs. In general, the relation between the enhanced $NLB_{M\_Enh}$ and DS flows can be summarized as:

$$NLB_{MEnh} \propto (1/DS\_flow\_factor)$$

The DS flow factor may be incorporated into the NLB calculations in several ways. As an example, it may be incorporated based on slot utilization. In this embodiment, the slots used by the DS flow are removed. Since during slot contention between a DS flow and BE flows it is highly likely that the DS flow will be given priority, removing the slots used by DS flows so as to eliminate this prioritization against other resource-contending users. The slot utilization can be a filtered number per sector averaged over a user-defined interval. This information should be available at the BTS level but may need to be extracted using an Application Programming Interface (API) and provided as an input to the NLB algorithm.

$$NLB_{MEnh} \propto (1/DS\_flows\_slot\_usage)$$

The NLB algorithm also considers a Effective SNR Delta ($SNR_{delta\_eff}$). When an AT is offloaded from a serving sector to a target sector, the decision is usually intended to improve the offloaded user's performance. The metrics do not consider the impact on the user experience of other users in the target sector. Often, however, offloading has a negative impact on other users in the target sector. $SNR_{delta\_eff}$ may be used to control the degree of degradation.

$SNR_{delta\_eff}$ is the effective change in network SNR due to an AT being offloaded. It should be noted that other metrics may alternatively be utilized in this role. For example, SNR may be replaced with other quantities such as Ec/Io or C/I, which also provide a representation of the user's DL channel. $SNR_{delta\_eff}$ is used as a representation of potential change in user/network throughput due to AT offloading. This can be viewed as a predictive metric and can be biased towards a given AT or sector throughput improvements. It may also help minimize AT offloadings that are less beneficial.

The following definitions are provided:

$SNR_t$=Average_$SNR_{target\_sector\_before\_AT\_Offloading}$ represents the average of SNR across all users in the target sector $SNR_s$=Average_$SNR_{source\_without\_given\_AT}$ represents the average of SNR across all users in the source sector not including given AT $SNR_{AT}$=Average_$SNR_{given\_AT}$ $SNR_{delta\_eff} = A*\text{Average}(SNR_t, SNR_{AT}) - B*SNR_s$ where A and B are constants. For example average number of active connections in the sector The $SNR_{delta\_eff}$ measurement may be incorporated into the NLB calculations in several ways. First, it may be implemented as a decision switch. In this embodiment, the NLB algorithm evaluates $SNR_{delta\_eff}$ for each target sector in the given AT's A_SET (A_SET). An $SNR_{delta\_eff\_threshold}$ datafill is introduced, which determines the maximum allowable change in network SNR. If sector $SNR_{delta\_eff}$ is below the $SNR_{delta\_eff\_threshold}$, the sector is considered for NLB. Otherwise, the sector is not considered as a candidate sector for offload. The NLB algorithm then uses all other NLB metrics to determine a winning sector for the AT from the candidate sectors for NLB.

Second, the $SNR_{delta\_eff}$ measurement may be implemented as a priority switch. In this embodiment, the NLB algorithm evaluates $SNR_{delta\_eff}$ for each target sector in the given ATs A_SET. The A_SET is ordered in the order of least $SNR_{delta\_eff}$. The NLB algorithm then uses other NLB metrics to determine the winning sector for the AT.

Third, the $SNR_{delta\_eff}$ measurement may be implemented by integrating it with NLB metrics. In the following equation, 'Function' combines the two indicated quantities. Weighting coefficients α and β may be utilized to adjust the metric towards a given AT's performance or all user/sector performance.

$$NLB_M = \text{Function}\left(\alpha * \frac{(Ec/Io)_{AT1}}{N_{eff}}, \beta * SNR_{delta\_eff}\right)$$

Note that the first term in the parentheses is the metric that determines the performance of a given AT. The second term is the metric that determines the performance of other users or the sector.

Figure 3:
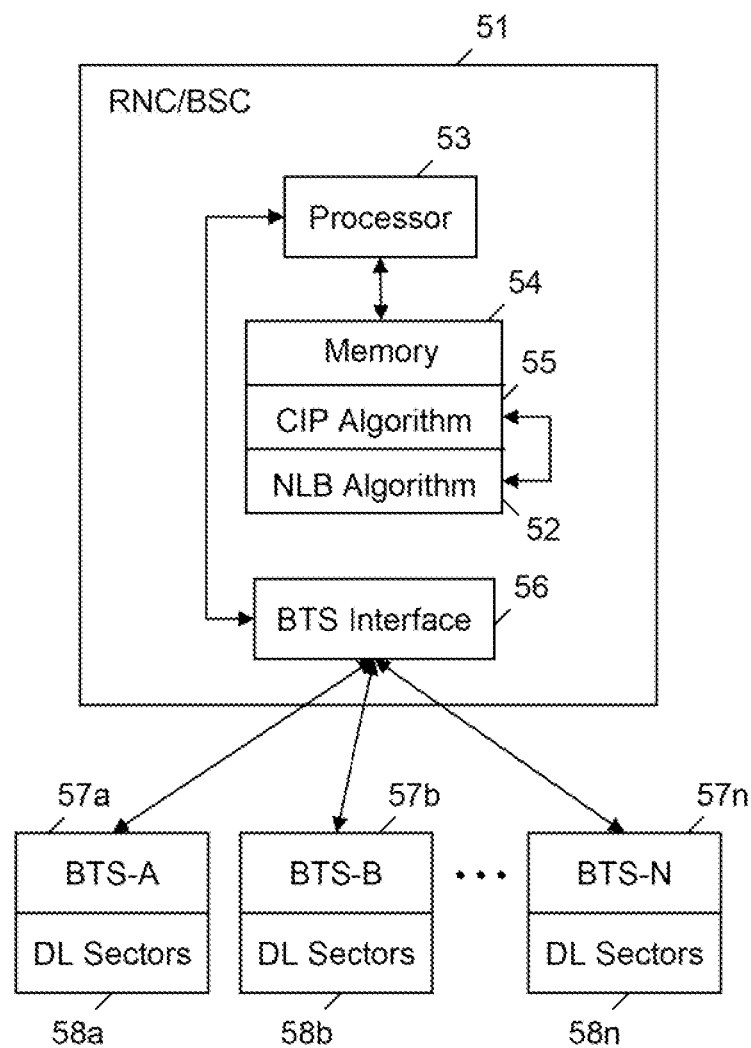
FIG. 3 is a simplified block diagram of an exemplary embodiment of an apparatus in an RNC/BSC for controlling the NLB algorithm in accordance with the teachings of the present invention.

FIG. 3 is a simplified block diagram of an exemplary embodiment of an apparatus in an RNC/BSC 51 for controlling the NLB algorithm 52. A processor 53 executes computer program instructions stored in a non-transitory memory 54. The computer program instructions include the NLB algorithm 52 and the CIP algorithm 55 running on top. When the processor executes the NLB and CIP algorithms, the apparatus performs the various steps illustrated in FIGS. 1A-1B and FIG. 2.

For completeness, the RNC/BSC 51 is also shown to include a BTS interface 56 for communicating data as well as various metrics, requests, responses, and instructions with a plurality of BTSs 57a-57n labeled BTS-A through BTS-N. BTSs 57a-57n control a number of DL sectors 58a-58n, respectively.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling a Network Load Balancing (NLB) algorithm that balances a traffic load between multiple downlink (DL) sectors in a cellular telecommunication network, the method being performed by a processor associated with a Radio Network Controller/Base Station Controller (RNC/BSC), the method comprising the steps of:
   detecting that the NLB algorithm has decided to offload a given Access Terminal (AT) from a current serving DL sector to one of a plurality of target DL sectors in the given AT's active set due to a high traffic load in the current serving DL sector;
   determining a count of previous attempts to offload the given AT from the current serving DL sector that failed because the given AT was not acquired by any of the target DL sectors within a threshold time period; and
   when the count of failed previous attempts to offload the given AT from the current serving DL sector exceeds a threshold amount, overriding the NLB algorithm decision to offload the given AT from the current serving DL sector by preventing unlocking of a Data Rate Control Lock (DRCLock) bit on the current serving DL sector.

2. The method according to claim 1, further comprising the steps of:
   determining whether a time period since an earlier failed attempt to offload the given AT is less than a predetermined time; and
   overriding the NLB algorithm decision to offload the given AT from the current serving DL sector when the time period since the earlier failed attempt is less than the predetermined time.

3. The method according to claim 1, further comprising the steps of:
   determining whether there are any target DL sectors in the given AT's active set that are currently allowed to acquire the given AT; and
   overriding the NLB algorithm decision to offload the given AT from the current serving DL sector when there are no target DL sectors in the given AT's active set that are currently allowed to acquire the given AT.

4. The method according to claim 1, further comprising, when the count of failed previous attempts to offload the given AT from the current serving DL sector does not exceed the threshold amount, the steps of:
   allowing the NLB algorithm decision to offload the given AT from the current serving DL sector, wherein the given AT is offloaded by unlocking the DRCLock bit in the current serving DL sector, which forces the given AT to select a different serving DL sector from the target DL sectors in the given AT's active set;
   determining whether the given AT is acquired by one of the target DL sectors within a threshold time period; and
   when the given AT is not acquired by one of the target DL sectors within the threshold time period, instructing all DL sectors in the given AT's active set having unlocked DRCLock bits to lock their DRCLock bits, thereby stopping all attempts to offload the given AT by the NLB algorithm.

5. The method according to claim 4, further comprising the steps of:
   starting an offload barring timer for the current serving DL sector to define a time period during which the NLB algorithm is prevented from offloading the given AT; and
   incrementing the count of failed attempts to offload the given AT from the current serving DL sector.

6. The method according to claim 4, further comprising the steps of:
   when the given AT is acquired by one of the target DL sectors within the threshold time period, determining whether the acquiring DL sector loses connection with the given AT for a defined time period; and
   when the acquiring DL sector loses connection with the given AT for the defined time period, instructing all DL sectors having unlocked DRCLock bits to lock their DRCLock bits, thereby stopping all attempts to offload the given AT by the NLB algorithm.

7. The method according to claim 1, further comprising, when the count of failed previous attempts to offload the given AT from the current serving DL sector does not exceed the threshold amount, allowing the NLB algorithm decision to offload the given AT from the current serving DL sector.

8. The method according to claim 7, wherein the given AT is offloaded by unlocking the DRCLock bit in the current serving DL sector, which forces the given AT to select a different serving DL sector from the target DL sectors in the given AT's active set, and the method further comprises the steps of:

determining which other DL sectors in the given AT's active set also have high traffic loads; and
  unlocking the DRCLock bit not only on the current serving DL sector, but also on the other highly loaded DL sectors, thereby forcing the given AT to move a target DL sector that is not highly loaded.

9. The method according to claim 7, further comprising the steps of:

determining whether the offload will move the given AT to a target DL sector having a capacity that is greater than the capacity of the current serving DL sector by less than a threshold amount; and
  overriding the NLB algorithm decision to offload the given AT from the current serving DL sector when the capacity of the target DL sector is greater than the capacity of the current serving DL sector by less than the threshold amount, thereby preventing excessive sector switching where a capacity benefit is too small.

10. The method according to claim 7, further comprising the steps of:

determining whether the offload will move the given AT to a target DL sector in which performance for a number of ATs in the target DL sector greater than a threshold amount will be adversely impacted by moving the given AT to the target DL sector; and
  overriding the NLB algorithm decision to offload the given AT from the current serving DL sector when performance for a number of ATs in the target DL sector greater than the threshold amount will be adversely impacted by moving the given AT to the target DL sector.

11. The method according to claim 1, further comprising the steps of:

determining a level of contention in the current serving DL sector; and
  controlling the RNC/BSC to send periodic Route Update Request messages to ATs in the current serving DL sector only when the determined level of contention in the current serving DL sector exceeds a minimum threshold level of contention.

12. An apparatus in a Radio Network Controller/Base Station Controller (RNC/BSC) for controlling a Network Load Balancing (NLB) algorithm that balances a traffic load between multiple downlink (DL) sectors in a cellular telecommunication network, the apparatus comprising:

a processor; and
  a non-transitory memory configured to store a Connection Integrity Preservation (CIP) algorithm;
  the processor being configured so that when the processor executes the CIP algorithm, the apparatus:
    detects that the NLB algorithm has decided to offload a given Access Terminal (AT) from a current serving DL sector to one of a plurality of target DL sectors in the given AT's active set due to a high traffic load in the current serving DL sector;
    determines a count of previous attempts to offload the given AT from the current serving DL sector that failed because the given AT was not acquired by any of the target DL sectors within a threshold time period; and
    when the count of failed previous attempts to offload the given AT from the current serving DL sector exceeds a threshold amount, overrides the NLB algorithm decision to offload the given AT from the current serving DL sector by preventing unlocking of a Data Rate Control Lock (DRCLock) bit on the current serving DL sector.

13. The apparatus according to claim 12, wherein when the processor executes the CIP algorithm, the apparatus:

determines whether a time period since an earlier failed attempt to offload the given AT is less than a predetermined time; and
  overrides the NLB algorithm decision to offload the given AT from the current serving DL sector when the time period since the earlier failed attempt is less than the predetermined time.

14. The apparatus according to claim 12, wherein when the processor executes the CIP algorithm, the apparatus:

determines whether there are any target DL sectors in the given AT's active set that are currently allowed to acquire the given AT; and
  overrides the NLB algorithm decision to offload the given AT from the current serving DL sector when there are no target DL sectors in the given AT's active set that are currently allowed to acquire the given AT.

15. The apparatus according to claim 12, wherein when the count of failed previous attempts to offload the given AT from the current serving DL sector does not exceed the threshold amount, the processor is further configured to cause the apparatus to:

allow the NLB algorithm decision to offload the given AT from the current serving DL sector, wherein the given AT is offloaded by unlocking the DRCLock bit in the current serving DL sector, which forces the given AT to select a different serving DL sector from the target DL sectors in the given AT's active set;
  determine whether the given AT is acquired by one of the target DL sectors within a threshold time period; and
  when the given AT is not acquired by one of the target DL sectors within the threshold time period, instruct all DL sectors in the given AT's active set having unlocked DRCLock bits to lock their DRCLock bits, thereby stopping all attempts to offload the given AT by the NLB algorithm.

16. The apparatus according to claim 15, wherein when the given AT is acquired by one of the target DL sectors within the threshold time period, the processor is further comfigured to cause the apparatus to:

determine whether the acquiring DL sector loses connection with the given AT for a defined time period; and
  when the acquiring DL sector loses connection with the given AT for the defined time period, instruct all DL sectors in the given AT's active set having unlocked DRCLock bits to lock their DRCLock bits, thereby stopping all attempts to offload the given AT by the NLB algorithm.

17. The apparatus according to claim 12, wherein when the count of failed previous attempts to offload the given AT from the current serving DL sector does not exceed the threshold amount, the processor is further configured to cause the apparatus to:

allow the NLB algorithm decision to offload the given AT from the current serving DL sector, wherein the given AT is offloaded by unlocking the DRCLock bit in the current serving DL sector, which forces the given AT to select a different serving DL sector from the target DL sectors in the given AT's active set;
  determine which other DL sectors in the given AT's active set also have high traffic loads; and unlock the DRCLock bit not only on the current serving DL sector, but also on the other highly loaded DL sectors, thereby forcing the given AT to move a target DL sector that is not highly loaded.

18. The apparatus according to claim 12, wherein when the count of failed previous attempts to offload the given AT from the current serving DL sector does not exceed the threshold amount, the processor is further configured to cause the apparatus to:
- allow the NLB algorithm decision to offload the given AT from the current serving DL sector;
- determine whether the offload will move the given AT to a target DL sector having a capacity that is greater than the capacity of the current serving DL sector by less than a threshold amount; and
- override the NLB algorithm decision to offload the given AT from the current serving DL sector when the capacity of the target DL sector is greater than the capacity of the current serving DL sector by less than the threshold amount, thereby preventing excessive sector switching where a capacity benefit is too small.

19. The apparatus according to claim 12, wherein when the count of failed previous attempts to offload the given AT from the current serving DL sector does not exceed the threshold amount, the processor is further configured to cause the apparatus to:
- allow the NLB algorithm decision to offload the given AT from the current serving DL sector;
- determine whether the offload will move the given AT to a target DL sector in which performance for a number of ATs in the target DL sector greater than a threshold amount will be adversely impacted by moving the given AT to the target DL sector; and
- override the NLB algorithm decision to offload the given AT from the current serving DL sector when performance for a number of ATs in the target DL sector greater than the threshold amount will be adversely impacted by moving the given AT to the target DL sector.

20. The apparatus according to claim 12, wherein when the processor executes the CIP algorithm, the apparatus is caused to:
- determine a level of contention in the current serving DL sector; and
- control the RNC/BSC to send periodic Route Update Request messages to ATs in the current serving DL sector only when the determined level of contention in the current serving DL sector exceeds a minimum threshold level of contention.

21. An apparatus in a Radio Network Controller/Base Station Controller (RNC/BSC) for controlling a Network Load Balancing (NLB) algorithm that balances a traffic load between multiple downlink (DL) sectors in a cellular telecommunication network, the apparatus comprising:
- a processor; and
- a non-transitory memory configured to store a Connection Integrity Preservation (CIP) algorithm;
- the processor configured so that when the processor executes the CIP algorithm, the apparatus:
  - detects that the NLB algorithm has decided to offload a given Access Terminal (AT) from a current serving DL sector to one of a plurality of target DL sectors in the given AT's active set due to a high traffic load in the current serving DL sector;
  - determines whether a time period since an earlier failed attempt to offload the given AT is less than a predetermined amount; and
  - overrides the NLB algorithm decision to offload the given AT from the current serving DL sector when the time period since the earlier failed attempt is less than the predetermined amount by preventing unlocking of a Data Rate Control Lock (DRCLock) bit on the current serving DL sector.

22. An apparatus in a Radio Network Controller/Base Station Controller (RNC/BSC) for controlling a Network Load Balancing (NLB) algorithm that balances a traffic load between multiple downlink (DL) sectors in a cellular telecommunication network, the apparatus comprising:
- a processor; and
- a non-transitory memory configured to store a Connection Integrity Preservation (CIP) algorithm;
- the processor configured so that when the processor executes the CIP algorithm, the apparatus:
  - detects that the NLB algorithm has decided to offload a given Access Terminal (AT) from a current serving DL sector to one of a plurality of target DL sectors in the given AT's active set due to a high traffic load in the current serving DL sector;
  - determines a count of previous attempts to offload the given AT from the current serving DL sector that failed because the given AT was not acquired by any of the target DL sectors within a threshold time period;
  - determines whether there are any target DL sectors in the given AT's active set that are currently allowed to acquire the given AT; and
  - override the NLB algorithm decision to offload the given AT from the current serving DL sector by preventing unlocking of a Data Rate Control Lock (DRCLock) bit on the current serving DL sector when either:
    - the count of failed previous attempts to offload the given AT from the current serving DL sector exceeds a threshold amount, or
    - there are no target DL sectors in the given AT's active set that are currently allowed to acquire the given AT.

* * * * *

UNITED STATES PATENT AND TRADEMARK OFFICE
CERTIFICATE OF CORRECTION

PATENT NO. : 8,694,018 B2  Page 1 of 1
APPLICATION NO. : 13/162305
DATED : April 8, 2014
INVENTOR(S) : Budic et al.

It is certified that error appears in the above-identified patent and that said Letters Patent is hereby corrected as shown below:

In the Specification

Column 8, Line 7, delete "given Entry" and insert -- given --, therefor.

Column 8, Line 53, delete "$SNR_s = Average\_SNR_{source\_without\_given\_AT}$" and insert -- $SNR_s = Average\_SNR_{source\_sector\_without\_given\_AT}$ --, therefor.

In the Claims

Column 12, Line 45, in Claim 16, delete "comfigured" and insert -- configured --, therefor.

Signed and Sealed this
Eleventh Day of November, 2014

Michelle K. Lee
*Deputy Director of the United States Patent and Trademark Office*